US009334124B2

(12) United States Patent
Teichrob et al.

(10) Patent No.: US 9,334,124 B2
(45) Date of Patent: May 10, 2016

(54) MATERIAL HANDLING CONVEYOR VEHICLE

(71) Applicant: Ty-Crop Manufacturing Ltd., Rosedale, British Columbia (CA)

(72) Inventors: Gary Wayne Teichrob, Rosedale (CA); Michael Perry Mazurenko, Chilliwack (CA); Allen Peter Heinrichs, Chilliwack (CA)

(73) Assignee: Ty-Crop Manufacturing Ltd., Rosedale, British Columbia (CA)

( * ) Notice: Subject to any disclaimer, the term of this patent is extended or adjusted under 35 U.S.C. 154(b) by 0 days.

(21) Appl. No.: 14/945,944

(22) Filed: Nov. 19, 2015

(65) Prior Publication Data
US 2016/0068349 A1 Mar. 10, 2016

Related U.S. Application Data

(62) Division of application No. 14/286,488, filed on May 23, 2014.

(51) Int. Cl.
*B65G 47/18* (2006.01)
*B65G 37/00* (2006.01)
*B65G 41/00* (2006.01)
*B65G 65/40* (2006.01)

(52) U.S. Cl.
CPC .............. *B65G 37/00* (2013.01); *B65G 41/008* (2013.01); *B65G 47/18* (2013.01); *B65G 65/40* (2013.01); *B65G 2207/40* (2013.01)

(58) Field of Classification Search
CPC .................................. B65G 47/18; B65G 21/14
See application file for complete search history.

(56) References Cited

U.S. PATENT DOCUMENTS

| 1,346,990 | A | 7/1920 | Stuart |
| 2,124,687 | A | 7/1938 | Carson |
| 3,086,465 | A | 4/1963 | De Montfort |

(Continued)

FOREIGN PATENT DOCUMENTS

| DE | 4235276 | 4/1994 |
| GB | 2 222 995 | 11/1940 |
| WO | WO 99/50091 | 10/1999 |

OTHER PUBLICATIONS

U.S. Appl. No. 14/732,928.

(Continued)

*Primary Examiner* — Gene Crawford
*Assistant Examiner* — Thomas Randazzo
(74) *Attorney, Agent, or Firm* — McDonnell Boehnen Hulbert & Berghoff LLP

(57) ABSTRACT

Material handling solutions for a mobile conveyor vehicle are provided. In one aspect, a vehicle having an infeed and output conveyor is provided, one of the conveyors being mounted non-rotatably to the vehicle and positioned by rotation-in-place of the vehicle via four wheel steering. In another aspect, a dust control cover for a telescoping conveyor is provided, having a pair of flexible flaps which are parted by a plough-shaped chute which travels through a gap between the flaps and delivers material to the lower conveyor section. In another aspect, a hydraulic fluid transmission system for a mobile conveyor vehicle is provided which makes use of at least one hollow structural element to route the hydraulic fluid. The structural member may radiate heat from the fluid for example to melt snow on the vehicle structure.

5 Claims, 17 Drawing Sheets

(56) References Cited

U.S. PATENT DOCUMENTS

| | | |
|---|---|---|
| 3,095,097 A | 6/1963 | Mellow |
| 3,231,066 A | 1/1966 | Harrison et al. |
| 3,265,232 A | 8/1966 | Lythgoe |
| 3,285,439 A | 11/1966 | Harverson |
| 3,310,161 A | 3/1967 | Kraft, Jr. |
| 3,314,557 A | 4/1967 | Sackett, Sr. |
| 3,501,193 A | 3/1970 | Gray |
| 3,530,832 A | 9/1970 | De Satnick |
| 3,567,048 A | 3/1971 | Whitham |
| 3,653,486 A | 4/1972 | McLean et al. |
| 3,669,245 A | 6/1972 | Wooten et al. |
| 3,753,506 A | 8/1973 | Palmer et al. |
| 3,884,346 A | 5/1975 | O'Neill et al. |
| 3,934,739 A | 1/1976 | Zumsteg et al. |
| 4,101,019 A | 7/1978 | Satterwhite |
| 4,187,047 A | 2/1980 | Squifflet, Sr. |
| 4,198,186 A | 4/1980 | Holdren et al. |
| 4,268,208 A | 5/1981 | Hankins et al. |
| 4,319,677 A | 3/1982 | Kipper |
| 4,330,232 A | 5/1982 | McClaren |
| 4,337,014 A | 6/1982 | Farnham |
| 4,345,869 A | 8/1982 | King |
| 4,387,798 A | 6/1983 | Jamison et al. |
| 4,392,776 A | 7/1983 | Shum |
| 4,465,420 A | 8/1984 | Dillman |
| 4,482,281 A | 11/1984 | Musil |
| 4,491,216 A | 1/1985 | Sawby |
| 4,561,821 A | 12/1985 | Dillman |
| 4,568,239 A | 2/1986 | Sims |
| 4,624,357 A | 11/1986 | Oury et al. |
| 4,629,060 A | 12/1986 | Schlegel et al. |
| 4,701,095 A | 10/1987 | Berryman et al. |
| 4,813,526 A | 3/1989 | Bélanger |
| 4,917,560 A | 4/1990 | Murray et al. |
| 4,924,993 A | 5/1990 | Buxton |
| 4,944,646 A | 7/1990 | Edwards et al. |
| 5,087,155 A | 2/1992 | Herman et al. |
| 5,125,771 A | 6/1992 | Herman et al. |
| 5,129,508 A * | 7/1992 | Shelstad ............ B65G 21/2081 198/836.1 |
| 5,141,528 A | 8/1992 | Boczkiewicz et al. |
| 5,203,442 A | 4/1993 | Oury et al. |
| 5,203,628 A | 4/1993 | Hamm |
| 5,277,489 A | 1/1994 | Hamm |
| 5,297,665 A | 3/1994 | Smith |
| 5,339,996 A | 8/1994 | Dubbert et al. |
| 5,340,259 A | 8/1994 | Flaskey |
| 5,427,497 A | 6/1995 | Dillman |
| 5,431,523 A | 7/1995 | Ferguson |
| 5,577,618 A | 11/1996 | Rafferty |
| 5,634,716 A | 6/1997 | Westall et al. |
| 5,640,996 A | 6/1997 | Schlecht et al. |
| 5,865,300 A | 2/1999 | Newsome |
| 6,135,171 A * | 10/2000 | Weakly ............... B65G 47/44 141/286 |
| 6,186,311 B1 | 2/2001 | Conner |
| 6,186,654 B1 | 2/2001 | Gunteret, Jr. et al. |
| 6,283,269 B1 | 9/2001 | Mayer |
| 6,293,689 B1 | 9/2001 | Guntert, Jr. et al. |
| 6,360,876 B1 | 3/2002 | Nohl et al. |
| 6,367,610 B1 | 4/2002 | Fortenbery et al. |
| 6,378,686 B1 * | 4/2002 | Mayer ................. B65G 21/14 198/311 |
| 6,386,352 B1 | 5/2002 | Baker et al. |
| 6,527,428 B2 | 3/2003 | Guntert, Jr. et al. |
| 6,540,039 B1 | 4/2003 | Yu et al. |
| 6,543,622 B1 | 4/2003 | Fridman |
| 6,688,450 B2 | 2/2004 | Speers et al. |
| 6,827,198 B1 | 12/2004 | Costanzo |
| 6,866,071 B2 * | 3/2005 | Fischer ............... B65G 69/181 141/286 |
| 6,910,586 B2 | 6/2005 | McCloskey |
| 6,929,113 B1 * | 8/2005 | Hoover ............... B65G 21/14 198/313 |
| 6,986,294 B2 | 1/2006 | Fromme et al. |
| 7,150,352 B2 | 12/2006 | Cotter et al. |
| 7,198,278 B2 | 4/2007 | Donaldson |
| 7,223,059 B2 | 5/2007 | Smith et al. |
| 7,255,194 B2 | 8/2007 | Lim et al. |
| 7,296,676 B2 | 11/2007 | Smith et al. |
| 7,789,217 B2 * | 9/2010 | Fischer ............... B65G 47/19 198/525 |
| 7,887,110 B2 | 2/2011 | Cheng et al. |
| 7,946,416 B2 | 5/2011 | Grose et al. |
| 8,025,140 B2 | 9/2011 | Whyte et al. |
| 8,033,376 B2 | 10/2011 | Toews et al. |
| 8,251,199 B2 | 8/2012 | Tebbe et al. |
| 8,322,507 B2 | 12/2012 | DeMong et al. |
| 8,348,044 B2 | 1/2013 | Tebbe et al. |
| 8,408,377 B2 | 4/2013 | Werlinger |
| 8,640,855 B2 * | 2/2014 | Brobst ................ B65G 11/206 193/32 |
| 8,944,239 B2 | 2/2015 | Campbell et al. |
| 8,944,740 B2 | 2/2015 | Teichrob et al. |
| 2007/0029170 A1 | 2/2007 | Anagnost |
| 2008/0008562 A1 | 1/2008 | Beckel et al. |
| 2008/0179054 A1 | 7/2008 | McGough et al. |
| 2009/0078410 A1 | 3/2009 | Krenek et al. |
| 2012/0219391 A1 | 8/2012 | Teichrob et al. |
| 2014/0023467 A1 | 1/2014 | Begley et al. |
| 2015/0044004 A1 * | 2/2015 | Pham ................. B65D 88/32 414/332 |

OTHER PUBLICATIONS

"Pro-Belt Horizontal Curve Design", [Retrieved from the Internet Oct. 1, 2015: <URL:http://www.pro-belt.com/hcurve.htm>].

"Sand Silo Sites", FB Industries Inc., Winkler, MB, Canada, Nov. 12, 2010.

"Troughed Belt Dual Direction Discharge Conveyor", Cisco-Eagle-Material Handling Experts, [Retrieved from the Internet Oct. 1, 2015: <URL:http://www.cisco-eagle.com/catalog/c-4220-dual-direction-tilting-discharge-belt-conveyor.aspx>].

"Vertical Conveyor Systems, Sprial Conveying Solutions", Ryson International, [Retrieved from the Internet Oct. 1, 2015: <URL:http://www.ryson.com/>].

Notice of Allowance received from the United States Patent and Trademark Office, dated Sep. 24, 2014 for U.S. Pat. No. 8,944,740.

Office Action received from the United States Patent and Trademark Office, dated Sep. 20, 2013 for U.S. Pat. No. 8,944,740.

Office Action received from the United States Patent and Trademark Office, dated Feb. 27, 2014 for U.S. Pat. No. 8,944,740.

Office Action received from the United States Patent and Trademark Office, dated Jul. 31, 2014 for U.S. Pat. No. 8,944,740.

Office Action received from the United States Patent and Trademark Office, dated Mar. 13, 2015 for U.S. Patent Publication No. 2012/0219391.

Office Action received from the United States Patent and Trademark Office, dated Sep. 18, 2015 for U.S. Patent Publication No. 2012/0219391.

Office Action received from the United States Patent and Trademark Office, dated Dec. 30, 2015 for U.S. Appl. No. 13/452,422.

Office Action received from the United States Patent and Trademark Office, dated Jan. 19, 2016 for U.S. Appl. No. 14/286,488.

* cited by examiner

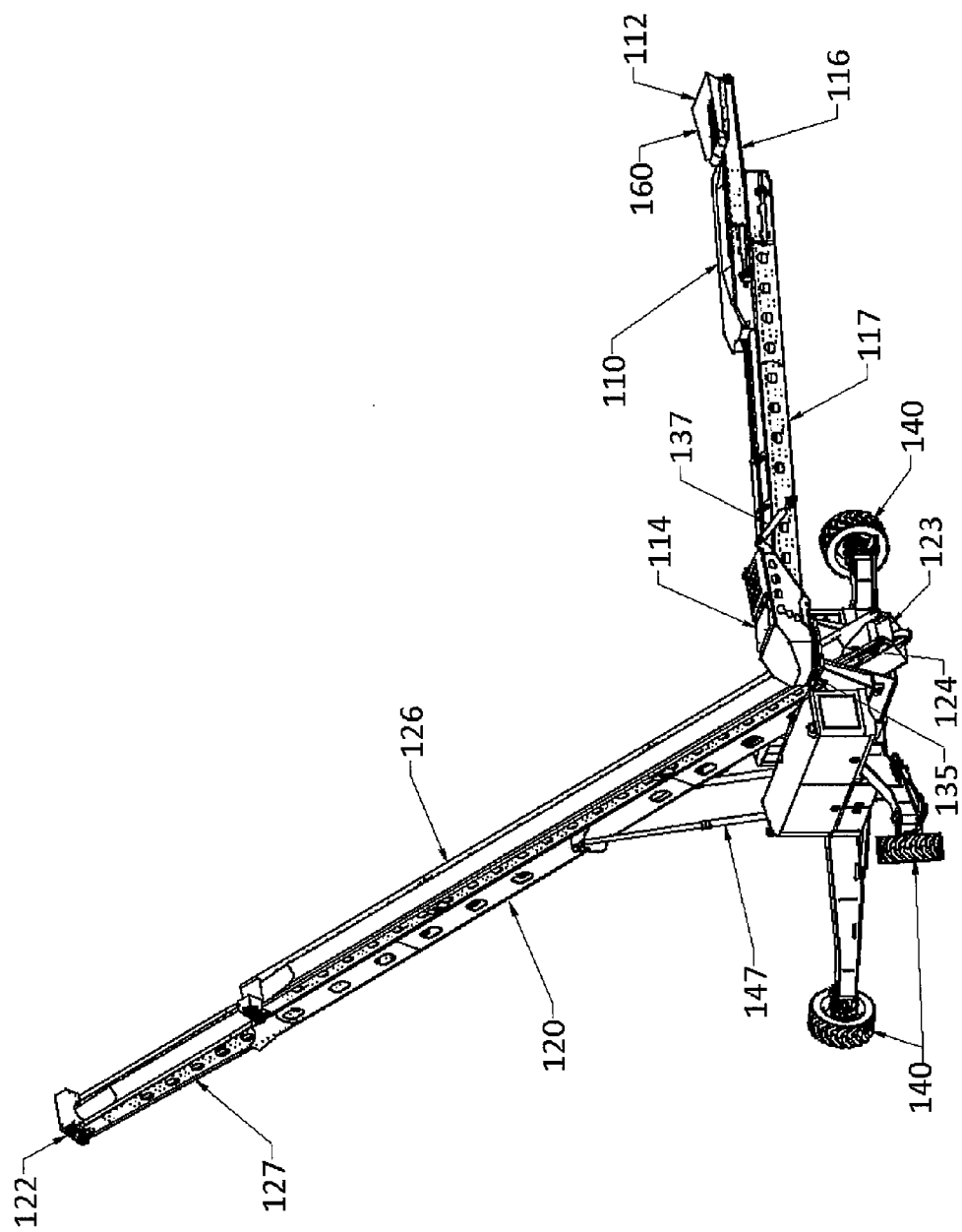

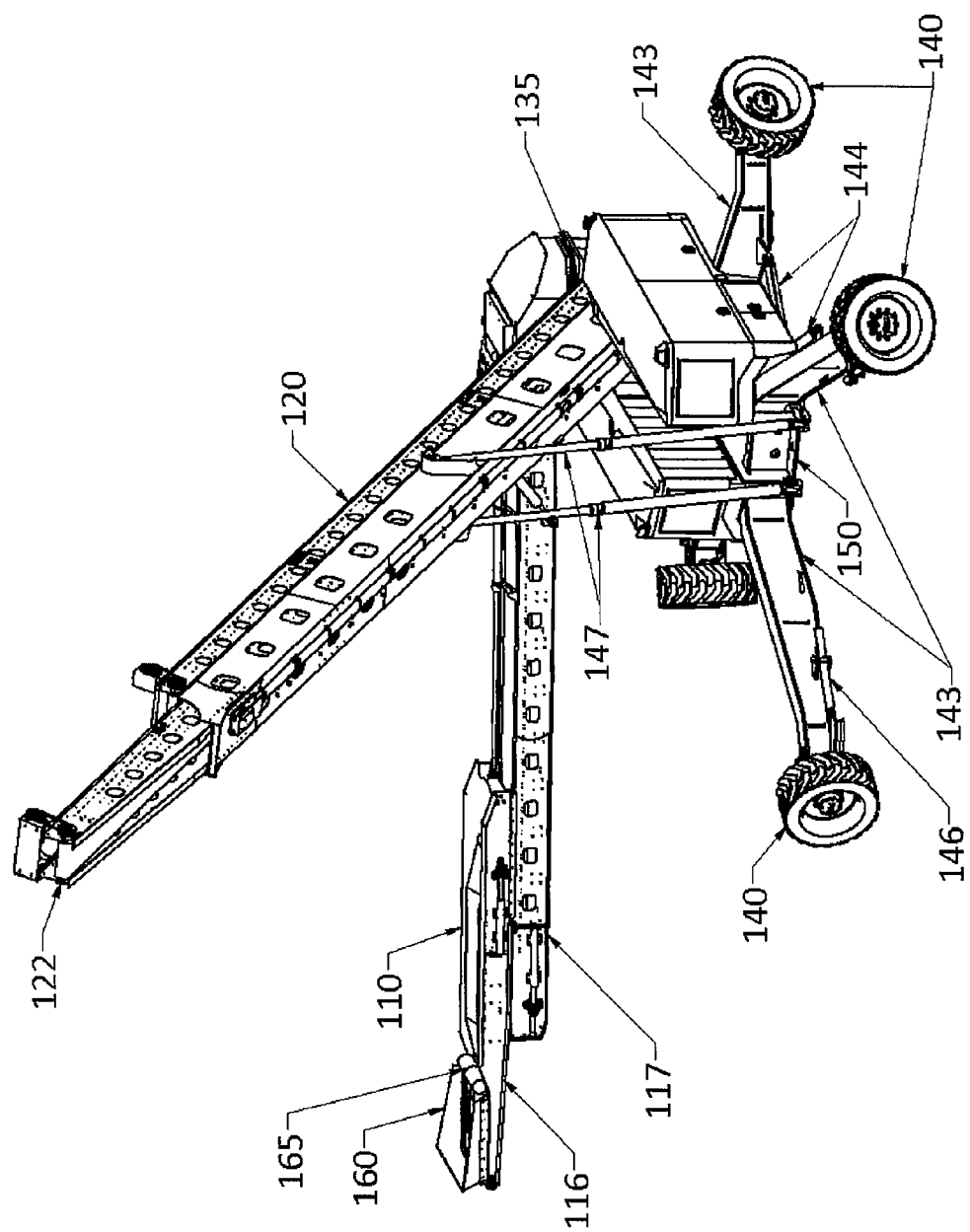

MATERIAL HANDLING CONVEYOR VEHICLE

This application is a divisional of U.S. patent application Ser. No. 14/286,488, filed May 23, 2014, which is incorporated by reference in its entirety.

FIELD OF THE INVENTION

The present invention pertains in general to bulk material handling systems and in particular to mobile conveyor systems for moving bulk granular material from one location to another.

BACKGROUND

Granular material, such as sand or hydraulic fracturing proppant, is used in bulk quantity in a number of applications. For example, in hydraulic fracture drilling by oil and gas and other industries, fracturing fluid, along with a granular proppant material such as sand and/or ceramics, is pumped into a drill well to create and prop open fractures in rock. Often, activities requiring large amounts of granular material are performed in a remote location, requiring granular material to be shipped in for example by road, rail or water. For such activities, it is desirable to have sufficient and often large amounts of granular material readily available for adequately reliably carrying out operations.

One component of an on-site mobile granular material delivery system is a mobile conveyor, which receives the material from a source such as a delivery truck, barge or rail car and conveys the material to an elevated location such as the input of a storage container. However, existing mobile conveyors can suffer from a variety of drawbacks, such complexity of operation potentially requiring a large number of personnel, and various mechanical design limitations that can limit performance of the delivery system.

In addition, concerns have been raised around the risk of silicosis due to inhalation of proppant material used in hydraulic fracturing, as well as other fine granular materials. Open conveyor systems may emit large amounts of dust and therefore pose a significant workplace health and safety risk. Dust mitigation is therefore a desirable feature of bulk material handling systems.

Therefore there is a need for a bulk granular material conveyor system that is not subject to one or more limitations of the prior art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a vehicle for conveying bulk granular material. In accordance with an aspect of the present invention, there is provided a mobile conveyor vehicle for transporting material, comprising: a chassis; a first conveyor system mounted to the chassis and non-rotatable horizontally relative to the chassis; a second conveyor system mounted to the chassis and rotatable relative to the chassis in the horizontal direction, the second conveyor system cooperating with the first conveyor system to transport the material; and a steerable, powered drive system supporting the chassis and configured for both transporting the vehicle and rotating the vehicle, wherein rotation of the vehicle causes corresponding rotation of the first conveyor system for position control thereof.

In accordance with another aspect of the present invention, there is provided a dust control apparatus for a telescopic conveyor system, the conveyor system including an upper conveyor section for delivering material from an input end to a transfer end, and a lower conveyor section in telescoping relation with the upper conveyor section; the apparatus comprising: a cover mounted overtop of the lower conveyor section, the cover comprising a pair of separate, flexible sections mounted on opposite sides of the lower conveyor section and extending toward one another; and a material transfer chute mounted at the transfer end of the upper conveyor section, the chute having an outer surface shaped to interpose between and force apart the flexible sections of the cover, the chute defining an internal aperture for flow of the material from the transfer end of the upper conveyor section onto the lower conveyor section.

In accordance with another aspect of the present invention, there is provided a hydraulic fluid transmission system for a mobile conveyor vehicle for transporting material, the vehicle including a conveyor section comprising a structural frame and a source of hydraulic fluid, the hydraulic fluid transmission system comprising at least one hollow metallic member forming a structural element of the structural frame, the at least one hollow metallic member extending along a length of the conveyor section, wherein the hollow metallic member is operatively coupled to the source of hydraulic fluid and is configured to operate as a hydraulic fluid transmission line, and further wherein the hollow metallic member is configured to radiate excess heat from the hydraulic fluid.

BRIEF DESCRIPTION OF THE FIGURES

These and other features of the invention will become more apparent in the following detailed description in which reference is made to the appended drawings.

FIGS. 1a to 1d illustrates a conveyor vehicle provided in accordance with one embodiment of the invention.

DETAILED DESCRIPTION OF THE INVENTION

Definitions

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention generally provides for aspects of a conveyor vehicle for transporting bulk material, such as sand, proppant, or the like. The vehicle includes a system of conveyors for transporting the material and a drive system for moving the vehicle relative to the ground, and aspects of the present invention may relate to one or both of the conveyor system and the drive system, as will be discussed in more detail below.

An aspect of the present invention provides for a steerable, powered drive system of a mobile conveyor vehicle which is configured for both transporting the vehicle and rotating the vehicle, for example for relocating the conveyor or conveyors of the vehicle. The drive system may include a four-wheel steering component for rotation of the vehicle about a predetermined or selected pivot point. The pivot point may be vertically aligned with a point on the vehicle, such that this point on the vehicle remains substantially stationary while the vehicle rotates. When the pivot point aligns or nearly aligns with a portion of the vehicle, then the rotation is described as rotation-in-place of the vehicle. More particularly, rotation of the vehicle is configured to cause corresponding rotation of one of the conveyor systems mounted to and extending from the vehicle, thereby facilitating desired positioning of a distal end of this conveyor system. This conveyor system may therefore be non-rotatably mounted to the vehicle chassis, which eliminates the requirement for a powered turntable for rotating the conveyor while the vehicle chassis remains stationary. This may also simplify the requirements for counterweights which counterbalance this conveyor system relative to the vehicle chassis.

Figure 1C:
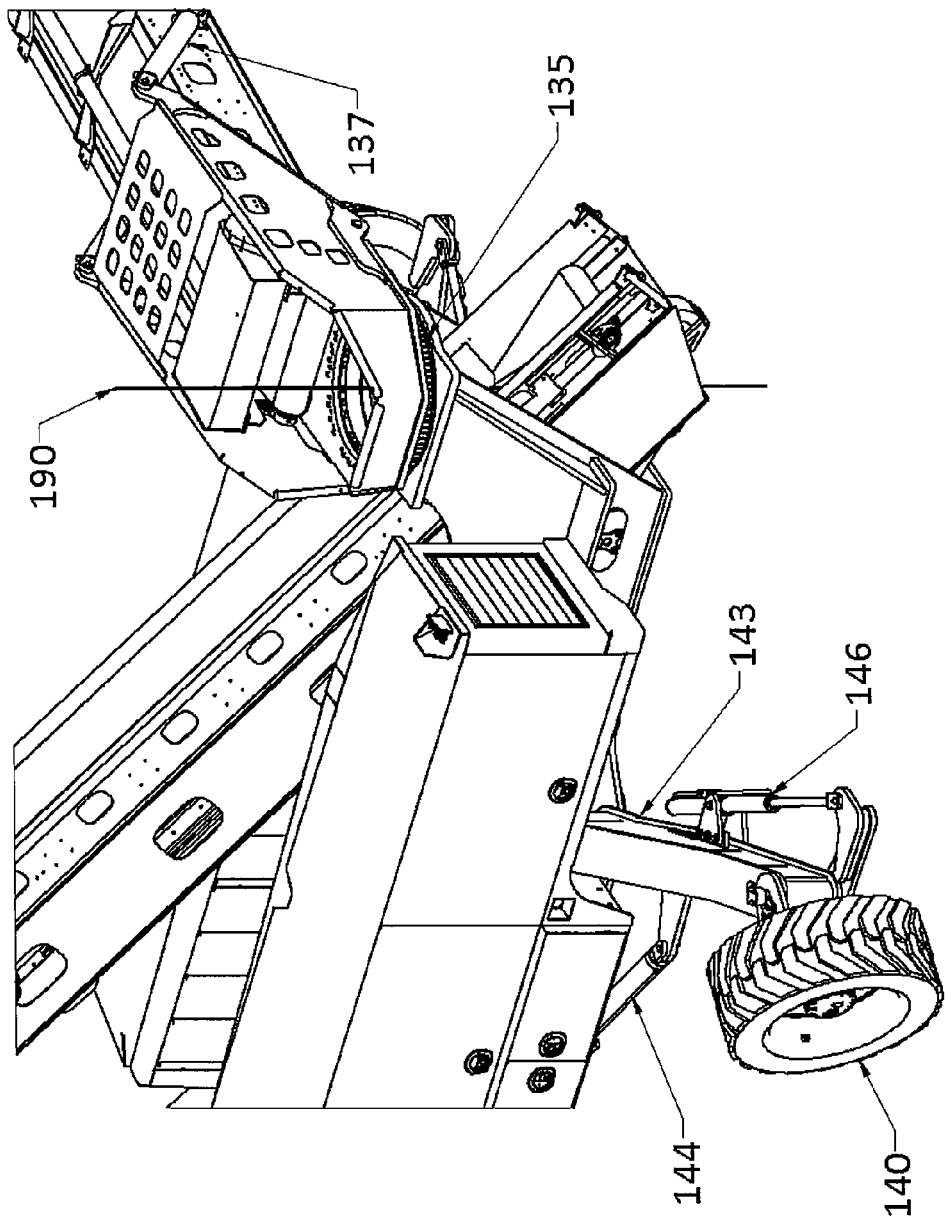

FIGS. 1a to 1c illustrate a conveyor vehicle provided in accordance with an embodiment of the invention. The vehicle includes an infeed conveyor 110 and an output conveyor 120 which cooperate to transport bulk material from a distal end 112 of the infeed conveyor to a distal end 122 of the output conveyor. Material is received at the distal end 112 and is conveyed, for example by powered belt conveyor, along the infeed conveyor and off of an output end 114 of the infeed conveyor for receipt, via gravity, by a receiving portion 124 of the output conveyor, either at an end or interior portion thereof. It is then conveyed by another belt conveyor along the output conveyor and off of the distal end 122 to a target container proximate to the conveyor vehicle. Various forms and types of belt conveyors may be provided. For example, belt conveyors may have a substantially flat or concave cross section, for example a V-shaped or U-Shaped cross section, possibly mounted on corresponding V-shaped or U-shaped roller assemblies. Belt conveyors may include features such as ledges formed across the width of the conveyor to assist in moving bulk material.

Position of the infeed conveyor 110 is adjustable relative to the remainder of the vehicle by use of suitable drive systems. As illustrated, the infeed conveyor 110 is mounted on a powered turntable 135 configured for rotating the infeed conveyor relative to the vehicle. At least one hydraulic cylinder 137, or more typically a pair of hydraulic cylinders located on opposite sides of the conveyor, or similar mechanical actuator is provided for raising and lowering the infeed conveyor. The infeed conveyor may be a telescoping conveyor comprising an upper section 116 movable relative to a lower section 117 under mechanical power of a telescoping drive mechanism such as a rack and pinion mechanism or a hydraulic system. For example, the upper section may be supported overtop of the upper section and generally parallel thereto. With the lower section held in place relative to the vehicle chassis, the upper section may be made to move in a longitudinal direction relative to the lower section, for example on a track, to extend or retract, thereby varying the length of the conveyor. By operating one or more of the turntable 135, the hydraulic cylinder 137 and the telescoping mechanism, the distal end 112 of the infeed conveyor may be placed in a variety of locations within a three-dimensional envelope, relative to the rest of the vehicle.

It is contemplated that, although hydraulic drivers are often referred to herein for operating various mechanical components of the vehicle, other types of mechanical drivers may be utilized. For example, the conveyors may be driven by electric motors, as may other mechanical components.

In some embodiments, the infeed conveyor may be supported by cantilever when receiving material, for example from a gravity-fed material outlet hatch of a truck, rail car, or the like. The hatch may be located on the bottom of a material container and the infeed conveyor may be located upwardly so that an infeed hopper 160 located at the distal end 112 is proximate to the hatch opening, for example to sealingly engage therewith. Such discharge hatches are typically found for example in the belly of a bulk tanker trailer. This may facilitate a reduction in the amount of dust or material loss during receipt of the bulk material at the distal end. Due to the cantilever support, the infeed conveyor and/or hopper need not rest on the ground, and therefore can be made to engage closely with the hatch opening.

Cantilever support may include a suitable counterbalance which may be provided for example by the vehicle weight and support footing geometry, possibly in conjunction with a counterweight designed for this purpose. In some embodiments, a locking mechanism or sufficiently robust raising/lowering actuator of the infeed conveyor may be provided to facilitate the cantilever support and holding in place of the conveyor against forces due to receipt of bulk material. For example, a hydraulic lift cylinder may raise the infeed conveyor into place, and a locking mechanism operable at different travel distances of the lift cylinder, such as a ratchet mechanism, may be used to assist in cantilever support of the infeed conveyor in its desired position.

Further, in some embodiments, the infeed hopper may have a height profile which is suitably limited so as to allow for positioning of the hopper between a hatch opening of the material source vehicle and substantially level ground supporting the vehicle. The hopper may be configured in this way given standard vehicle clearance heights as would be readily understood by a worker skilled in the art. The hopper may comprise or interact with rigid or flexible sidewalls which form an enclosure around the hatch opening in order to inhibit dust egress during material transfer.

In some embodiments, the conveyors may include top covers for containing dust and bulk material and/or preventing external material or moisture from entering the bulk material. The top covers are generally not illustrated in the figures, other than the particular cover comprising the pair of flexible sections as illustrated for example in FIGS. 3aa to 4d.

In some embodiments, as illustrated in FIG. 1b, an idler roller 165 is located proximate to the infeed hopper, overtop of the conveyor belt of the infeed conveyor. The idler roller may contact or nearly contact the infeed conveyor during operation, such that bulk material can be interposed between the idler roller and the infeed conveyor, the bulk material being in contact with both the idler roller and the conveyor surface. The idler roller 165 has an axis of rotation parallel to that of the conveyor rollers which facilitate motion of the conveyor. Bulk material on the conveyor passes between the idler roller 165 and the conveyor. This causes the idler roller to generally force the bulk material toward the conveyor, thereby reducing bouncing tendency of the bulk material and assisting in settling the material onto the conveyor for upward conveyance. The bulk material may in some embodiments be compressed by the idler roller, thereby further assisting in settling the material onto the conveyor. Such an idler roller may increase bulk material flow rate on the conveyor, since such material otherwise tends to bounce and churn at the bottom of the conveyor when it initially falls onto the conveyor. The idler roller may optionally further operate to compact the material on the conveyor.

Position of the output conveyor 120 is also adjustable. As illustrated, the output conveyor 120 is non-rotatably mounted to the vehicle chassis 150 rather than being placed on a turntable. That is, the output conveyor 120 is fixed relative to the vehicle chassis about a vertical rotation axis and does not rotate horizontally with respect to the chassis, i.e. axially about a vertical axis and in the horizontal plane. Horizontal rotation of the output conveyor relative to the operating environment is achieved by rotation of the vehicle by operation of its drive wheels 140, as will be described in more detail below. Each drive wheel is mounted at the end of a corresponding support arm 143, which may be pivotably mounted to the vehicle chassis and driven for example by hydraulic cylinders 144. One or more hydraulic cylinders 147, typically a pair of hydraulic cylinders, or similar mechanical actuator is provided for raising and lowering the output conveyor. The output conveyor may be a telescoping conveyor comprising a distal section 127 movable with respect to a base section 126 under mechanical power of a telescoping mechanism. The distal section 127 may be nested within or suspended below the base section 126, and may be supported and guided via a track, for example. By operating one or more of the drive wheels 140, the hydraulic cylinder 147 and the telescoping mechanism, the distal end 122 of the output conveyor may be placed in a variety of locations within a three-dimensional envelope, for example generally relative to a pivot point of the vehicle. The drive wheels may be pivoted on their support arms for example by operation of hydraulic cylinders 146.

As mentioned above, one or both of the infeed and output conveyors systems may be telescoping. A telescoping conveyor system may comprise two or more belt style conveyors arranged in a cascading fashion, wherein adjacent conveyors are mounted on supports which are relatively movable in a longitudinal direction of the conveyor system, thereby allowing lengthening or shortening of the conveyor system.

FIG. 1c illustrates a particular vertical axis of rotation 190 about which the vehicle can rotate due to operation of the drive wheels. As illustrated, the axis of rotation 190 passes through or near the center of the turntable 135 of the infeed conveyor. This simplifies operation since the infeed conveyor can be retained in position during vehicle rotation simply by counter-rotating the turntable 135. However, by adjusting the angle of the drive wheels and/or support arms, the location of the axis of rotation 190 can be shifted within a two-dimensional operating envelope. The turntable may connect the infeed conveyor to the vehicle via a slewing bearing such that the infeed conveyor may be rotated, differentially from the discharge section, about an axis in yaw.

As is shown for example in FIG. 1a, the output conveyor 120 includes a lower section 123 on an opposite side of a pivot from the distal end 122. However, in various embodiments this lower section may be excluded, or at least shortened relative to the illustration. In some embodiments, when the distal end 122 of the output conveyor is raised, the lower section 123 is correspondingly lowered since it is on the opposite side of the pivot. The infeed conveyor 110 and the turntable 135 may be mounted directly to the lower section 123. As such, the angle of inclination of the infeed conveyor 110 decreases as the output conveyor is raised. This may allow for decreased energy expenditure for operating the infeed conveyor, for example.

Figure 1D:
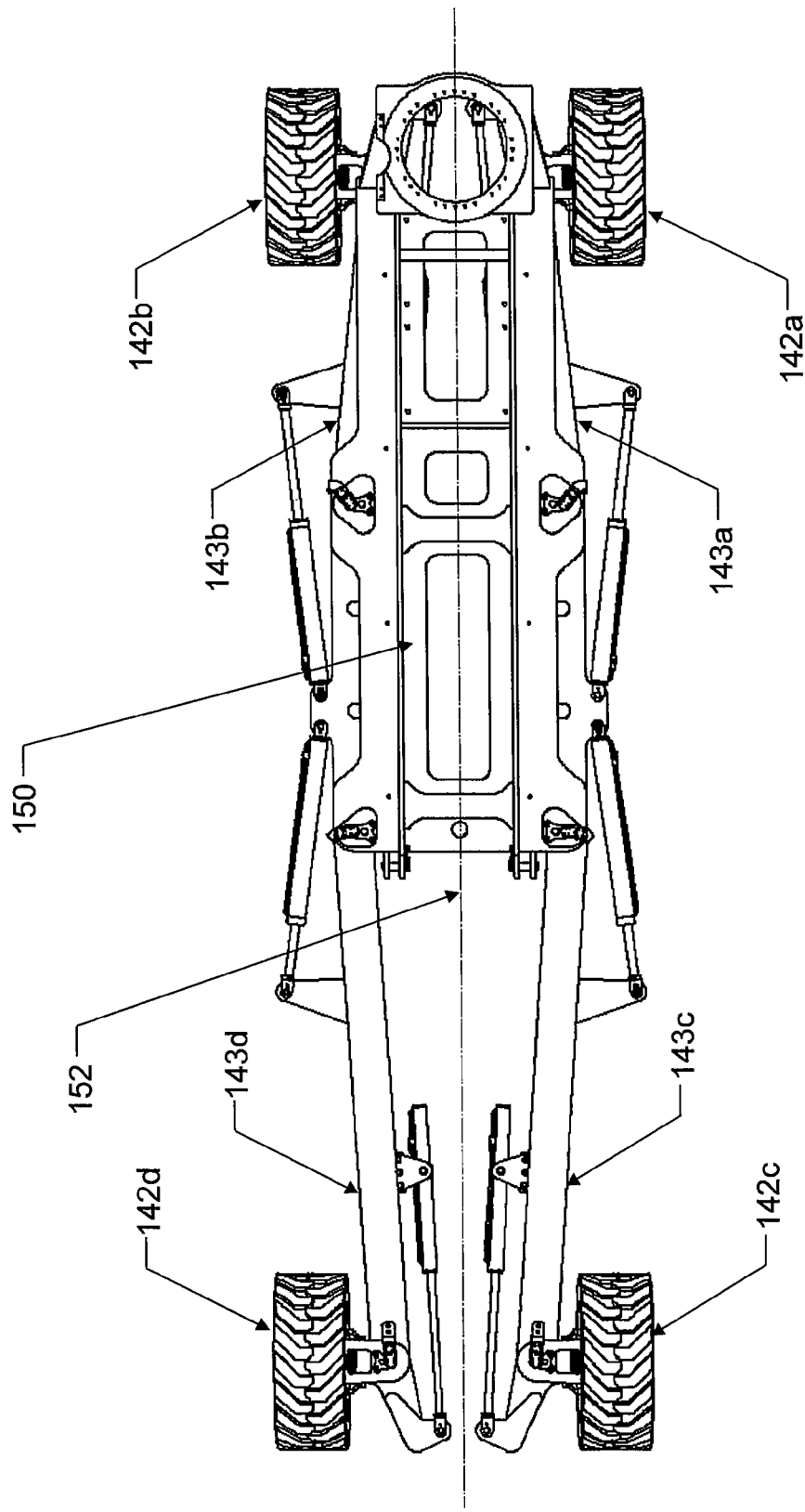

FIG. 1d illustrates the conveyor vehicle with the support arms in a stowed position. In particular, a first pair of the support arms 143c, 143d are oriented proximate to each other forward of the chassis 150 and a second pair of the support arms 143a, 143b are oriented proximate to each other rearward of the chassis 150. This reduces vehicle width for stowage for example on or inside a semi-trailer.

It is noted that, in the stowed configuration the wheels 142a, 142b, 142c, 142d are generally parallel to each other. Indeed, in some embodiments, the stowed position can potentially also be used as a transportation configuration in which the vehicle is driven generally linearly due to the parallel but still steerable wheels. However, for greater stability, the support arms may be separated from each other somewhat in the transportation configuration, such that the wheels are still orientable substantially parallel to each other for driving the vehicle generally linearly. For example the wheels may be oriented as illustrated in FIG. 1d but with wheels 142a, 142b and wheels 142c, 142d separated pairwise by a greater distance than illustrated in FIG. 1d, such separation achieved by reorientation of the support arms outward from the vehicle midline. In various embodiments, one or more transportation configurations may be possible, each of which allows the wheels to be orientable parallel to each other and also parallel with one or more given directions relative to the midline 152 of the vehicle, for driving the vehicle in such a given direction.

Figure 2:
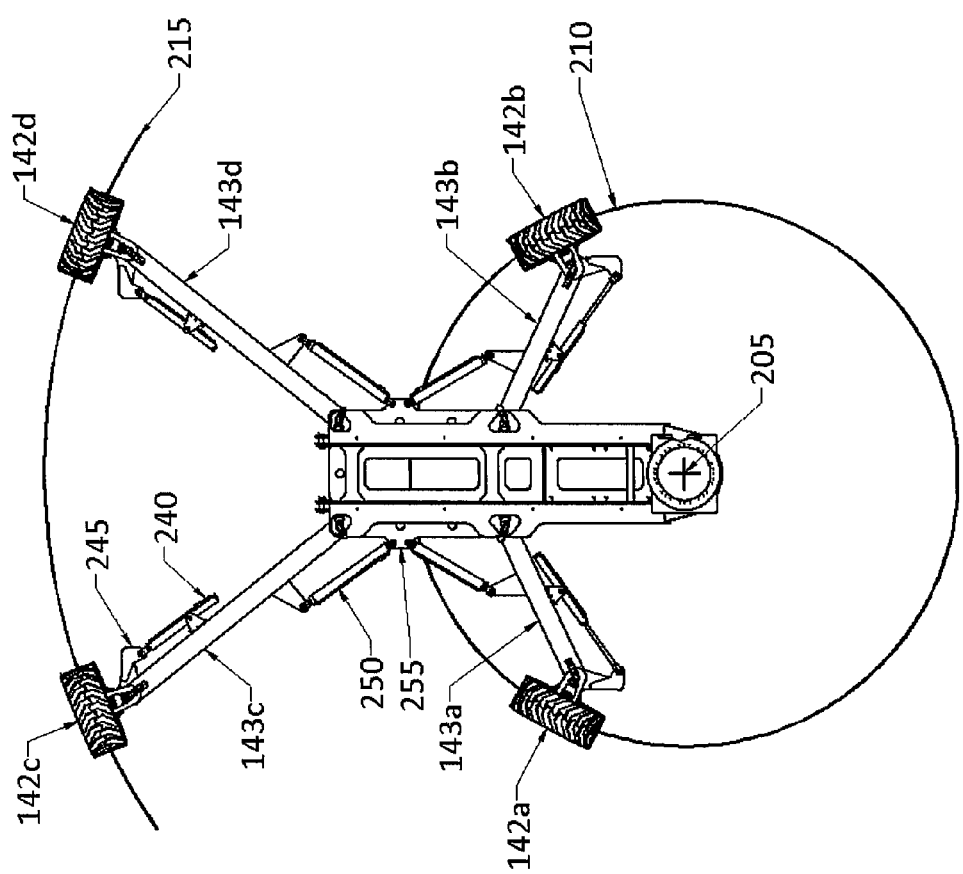
FIG. 2 illustrates a top view of the conveyor vehicle of FIGS. 1a to 1d.

FIG. 2 illustrates a top view of the conveyor vehicle in which the drive wheels are angled for rotation-in-place about a pivot point 205. A first pair of wheels 142a, 142b are angled tangentially with respect to a first circle 210, and a second pair of wheels 142c, 142d are angled tangentially with respect to a second circle 215, both circles having their center at the pivot point 205. As the second circle has a larger circumference than the first circle, the second pair of wheels are generally driven faster than the first pair of wheels during rotation-in-place. By adjusting the angles of all wheels, the position of the circle center and pivot point 205 can be adjusted, allowing the vehicle to be rotated about a selectable pivot point. In various embodiments, each of the wheels may be independently driven at a selected speed and direction, independently steerable, or both.

In some embodiments, the pivot point 205 may be aligned with a pivot point of the infeed conveyor's supporting turntable. This may simplify operation, for example by maintaining the distal end 112 of the infeed conveyor in place while rotating the vehicle about the pivot point 205 by counter-rotating the turntable at the same speed but opposite direction as rotation of the vehicle.

In various embodiments, steering of each wheel may be performed by adjusting the angle of the corresponding wheel 142a, 142b, 142c, 142d relative to the current position of its support arm, the wheels mounted on a wheel assembly which in turn is pivotably mounted to the support arms. In some cases steering may also be performed in part by adjusting the angle of the corresponding pivotably mounted support arm 143a, 143b, 143c, 143d relative to the vehicle chassis. Pivoting of the support arms and/or wheels may be performed by mechanical drivers such as hydraulic cylinders, gear systems, or the like.

In some embodiments, for example as illustrated in FIG. 2, a hydraulic cylinder 240 is coupled at one end to the support arm 143c and at the other end to a steering knuckle 245 mounted on a wheel assembly. Driving of the steering knuckle by the hydraulic cylinder causes pivoting of the wheel assembly for steering. Further, another hydraulic cylinder 250 is coupled at one end to the chassis 255 and at the other end to the support arm 143c or protrusion thereof, such that driving of this hydraulic cylinder causes pivoting of the corresponding support arm. This arrangement can be provided for each wheel and support arm. As illustrated, the wheel assemblies are capable of pivoting over an angle of about 110 degrees, and the support arms are capable of pivoting over angles of at least about 30 degrees. These angular ranges may be adjusted by adjusting the length and position of the hydraulic cylinders and their mounting points, and/or by removing portions of the chassis which may impede further motion of the support arms.

It is noted that, in some embodiments the vehicle may only require wheels pivotable relative to the support arms or support arms pivotable relative to the chassis, but not necessarily both, in order to achieve rotation such as rotation-in-place. However, use of both pivotable wheels and pivotable support arms may confer certain advantages, such as range of control, flexibility of vehicle operation, adjustable vehicle stability, and the like, as described elsewhere herein. The support arms may be of similar or different lengths and mounted at various relative locations.

In some embodiments, independent driving of each wheel may be facilitated by providing a wheel drive gear assembly interposed between the wheel hub and the steering knuckle. The gear assembly comprises a first face coupled to the wheel hub and a second fact coupled to the steering knuckle, the first and second faces rotatable with respect to each other and driven by a hydraulic motor. When the hydraulic motor delivers power to the gear assembly, the assembly operates to turn the wheel at a given speed, which is generally variable.

While the above embodiment utilizes a turntable for positioning the infeed conveyor and a four-wheel steering configuration for positioning the output conveyor, it is appreciated that, in some embodiments, the opposite configuration may also be used, i.e. utilizing a turntable for positioning the output conveyor and a four-wheel steering configuration for positioning the infeed conveyor, the infeed conveyor being non-rotatable with respect to the chassis.

In various embodiments, in addition to facilitating rotation of the vehicle, the wheels and/or support arms are further configured for transporting the vehicle from place to place. For this purpose, the wheels may be aligned so that they are generally parallel to each other and steered in a conventional two-wheel or four-wheel steering manner. Depending on the range of pivoting motion of the wheels and support arms, the support arms may be placed in a variety of angular configurations while allowing the wheels to be aligned generally parallel. For example, if the support arm mounting points define the four corners of a rectangle, and 90 degree pivotability of both the wheels and the support arms can be achieved, then a range of such transportation configurations may be achievable, along a continuum from one extreme in which all support arms are parallel to the long side of the rectangle to another extreme in which all support arms are parallel to the short side of the rectangle. In some embodiments, the support arms may be folded against the chassis, thereby reducing the footprint of the vehicle for compact stowage thereof.

By positioning the support arms at a particular set of angles (for example about 45 degrees) relative to the chassis, the separation between the wheels, or the area defined by a shape having the wheels as vertices, can be increased or even maximized, thereby providing for a relatively wide support base for the vehicle and correspondingly high stability. This may be particularly useful during material conveyance.

In various embodiments, the support arms may be positioned such that the wheels are separated from the pivot point by at least a threshold distance, and possibly by a substantially maximum achievable distance. This may provide for increased rotational position control. For example, given a circle centered on the pivot point and along which one or more of the wheels travels for vehicle rotation, as the diameter of this circle increases, one turn of the wheel corresponds to a smaller angular rotation of the vehicle, and hence for a limited granularity of control over wheel rotation, more accurate angular position can be achieved for a larger diameter circle. Furthermore, steering of the wheel can be more accurately achieved when following a larger circle than when following a smaller circle, due to the difficulty of tracking a more quickly varying curvature of the smaller circle.

In various embodiments, since the support arms rotate along with the output conveyor, the vehicle remains at roughly the same level of stability regardless of where the output conveyor is positioned. That is, the position of the base, i.e. the ground-contacting points, of the vehicle is substantially unchanged relative to the position of the output conveyor during rotation of the output conveyor. Hence, if the vehicle's center of gravity is dictated in large part by the vehicle body and output conveyor (relative to that portion dictated by the position of the infeed conveyor), then said center of gravity essentially does not move relative to the vehicle's wheels during rotation of the output conveyor. In contrast, if the vehicle chassis were to remain in place and the output conveyor rotated via turntable, a relatively larger counterweight would be required for the output conveyor, and stability may potentially vary with rotation if the wheels of the vehicle are arranged in a rectangular layout. Therefore, embodiments of the present invention provide for an alternative approach to supporting a rotatable portion of a vehicle which has a center of gravity which travels through a significant arc.

Figure 3A:
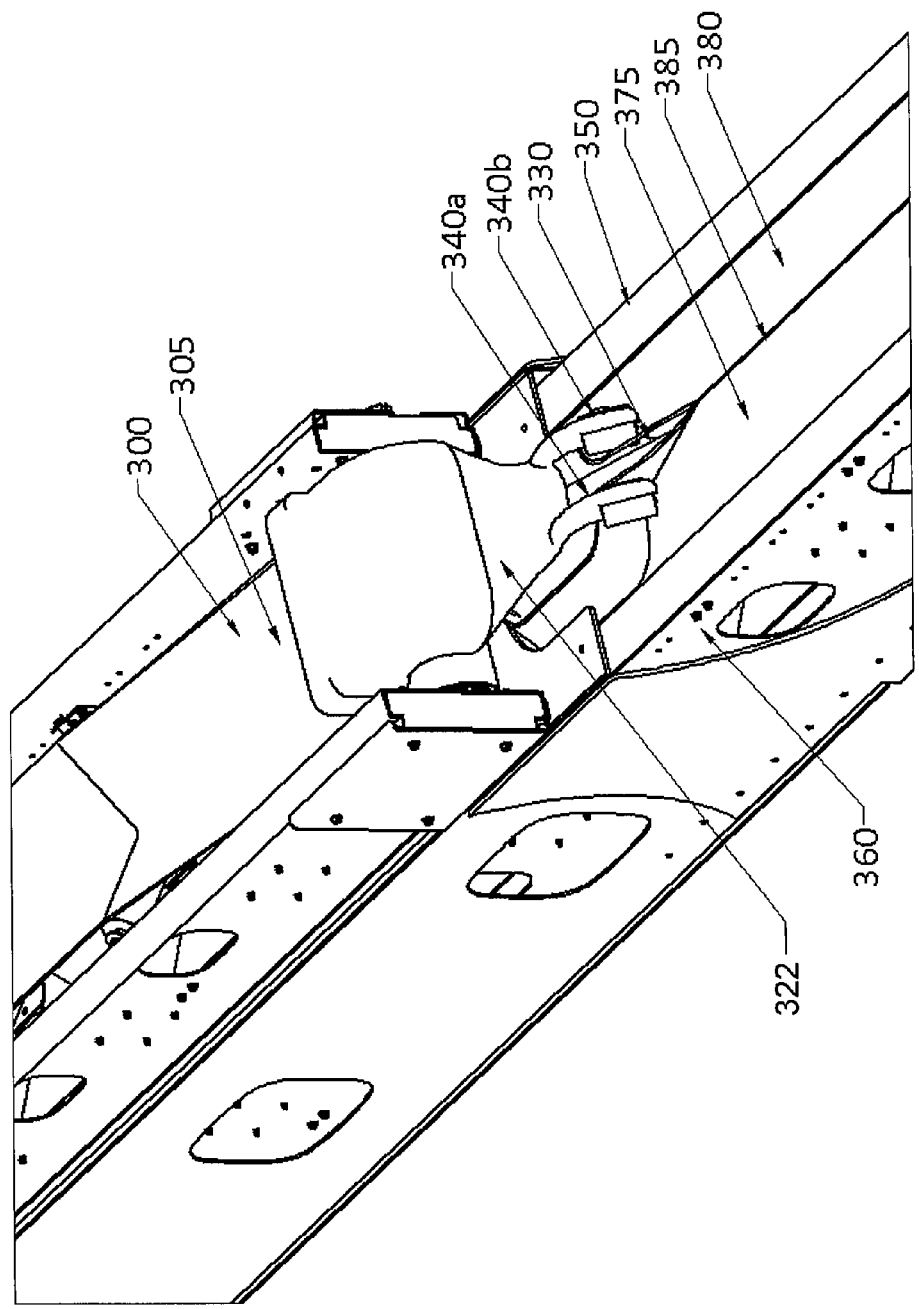
FIGS. 3aa, 3ab, 3b and 3c illustrate a dust control apparatus provided in accordance with one embodiment of the invention.
Figure 3A:
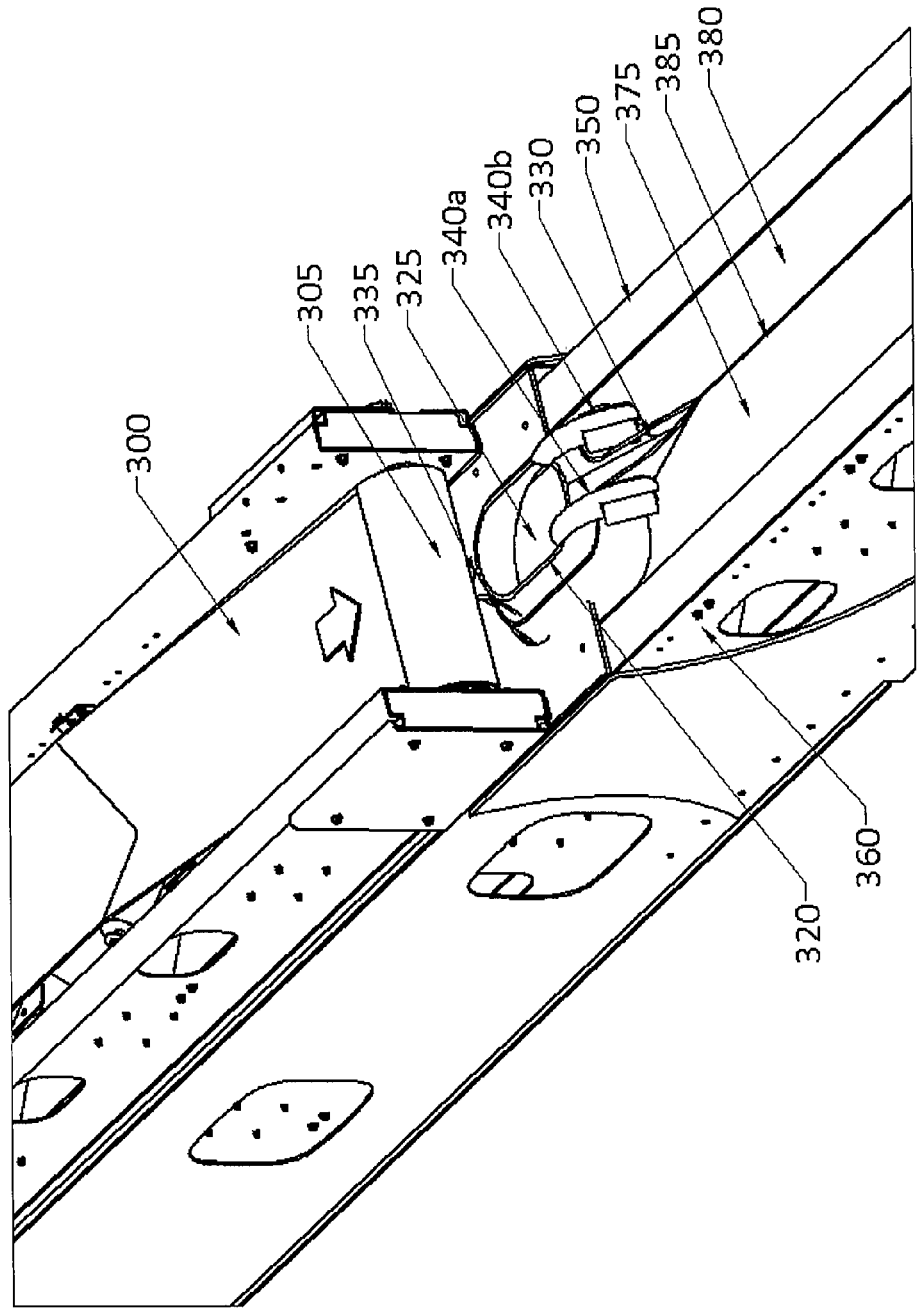
Figure 3B:
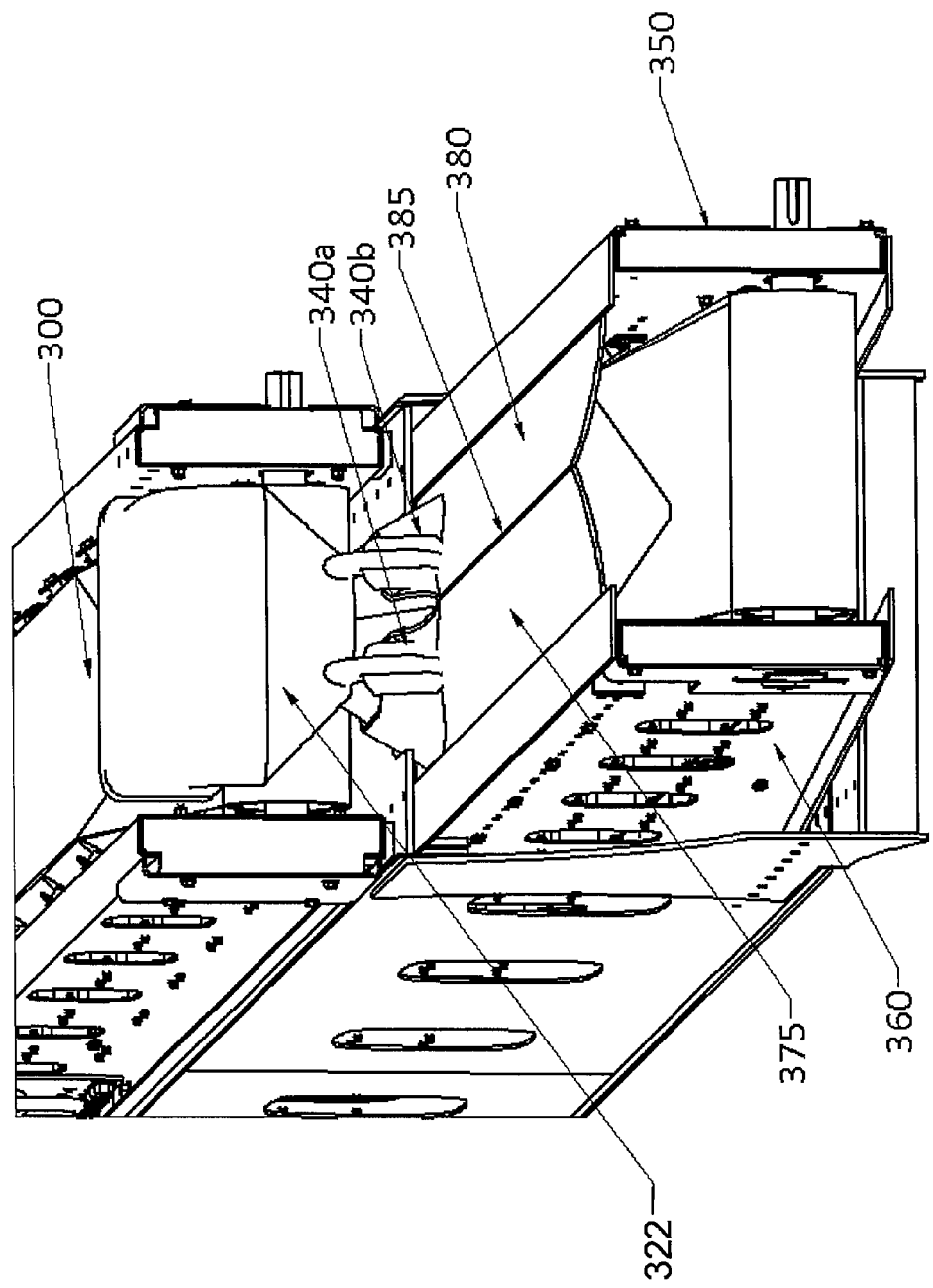

Another aspect of the present invention provides for a dust control apparatus for a telescopic conveyor system, such as that of the conveyor vehicle describe herein. With reference, by way of example, to FIGS. 3aa, 3ab, 3b and 3c, the conveyor system comprises an upper conveyor section 300 and a lower conveyor section 350, the upper conveyor section configured for conveying material toward the lower conveyor section, and the lower conveyor section configured for conveying material away from the upper conveyor section. Material falls from the upper conveyor section to the lower conveyor section at a transfer end 305 of the upper conveyor section. The transfer end is shaped, for example with endwalls and/or vertical depressions, so as to direct material into a bottom aperture which is associated with the aperture 325 of the material transfer chute 320, to be described below. The two conveyor sections may be generally parallel and are telescopically mounted one with respect to the other so that a controllable amount of the upper conveyor can be made to lie overtop of the lower conveyor, by movement of either the upper conveyor or the lower conveyor for example via a rack-and-pinion or other mechanism. At least the lower conveyor section includes sidewalls 360. Each of the conveyor sections also includes and a bottom section having a flat or curved belt or bucket-style conveyor, or the like.

Figure 3C:
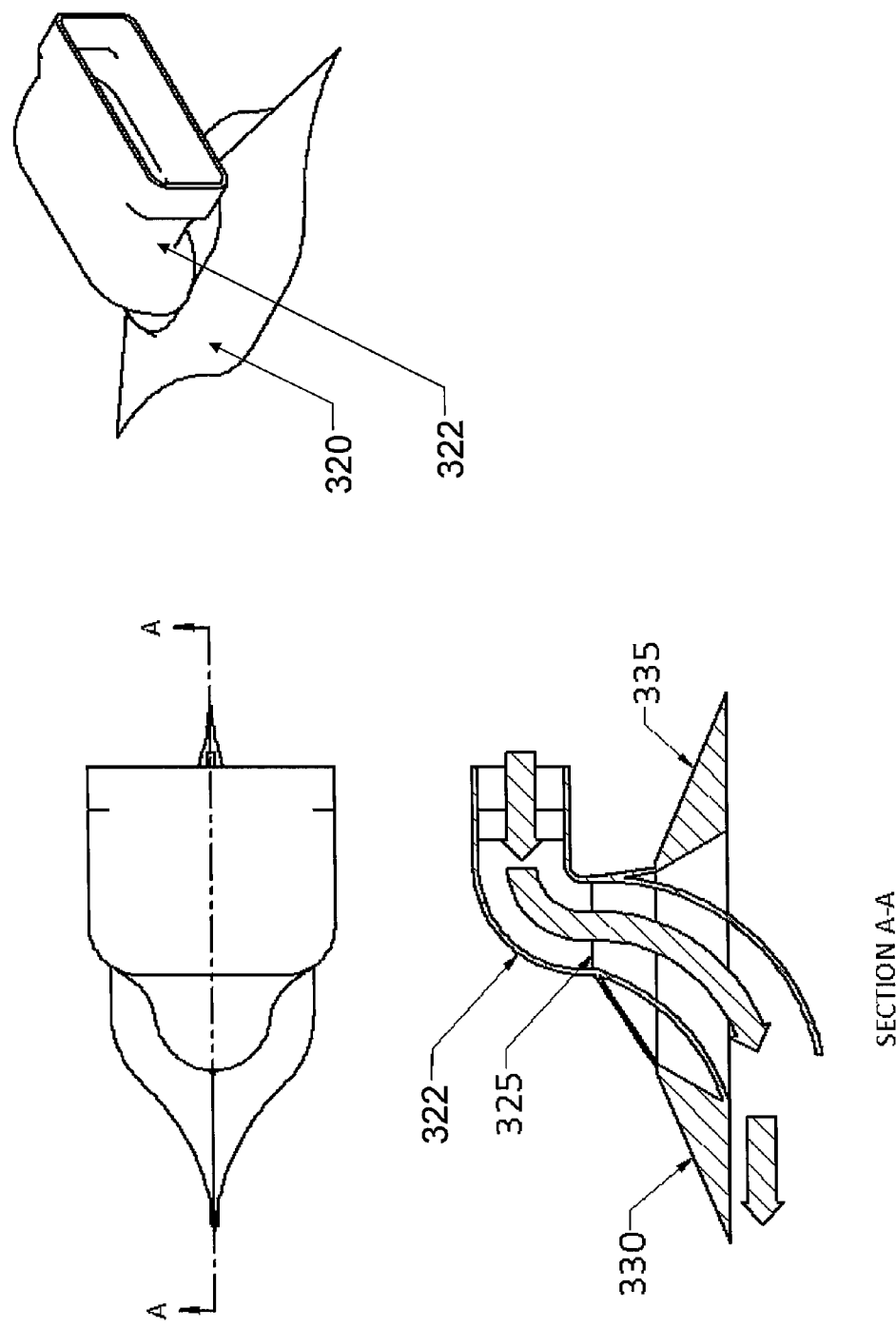

FIG. 3aa illustrates a tunnel component 322 forming an upper part of the material transfer chute 320, while FIG. 3ab illustrates the dust control apparatus with the tunnel component removed for clarity. The tunnel component 322 extends upward and curves to form a horizontal intake for receiving material horizontally from the upper conveyor section 300. FIG. 3c further illustrates top, perspective and sectional views of the chute 320 including the tunnel component 322. As illustrated, the chute 320 with tunnel component 322 forms a substantially downward curving and "S" shaped channel for guiding the material downward from the upper conveyor section 300 to the lower conveyor section 350 through the aperture 325. This channel may be described as an S tunnel without a lower floor. The bulk material is driven horizontally off the upper conveyor section 300 into the channel, which contains and directs the material. Due to its shape, the channel may maintain at least some forward momentum of the bulk material, since the channel continues substantially in the same direction as the upper conveyor section. Furthermore, the channel may function to limit or even minimize turbulence or "boiling" as the material reaches the lower conveyor section 350. Alternatively, the tunnel component 322 may optionally be replaced with a funnel or other hollow component for guiding material from the upper conveyor section 300 into the aperture 325. FIG. 3c also illustrates how material flows through the aperture 325 or centroid of the plough-shaped chute 325.

More notably, the lower conveyor section includes a cover which is mounted across the tops of the sidewalls and extend along at least a portion of the lower conveyor's length to form an enclosed area through which material is conveyed. The cover may include a pair of flexible sections 375, 380 mounted on opposite sides of the lower conveyor and extending toward one another, and overlapping, meeting or almost meeting at a generally linear location 385 which runs parallel to the length of the lower conveyor. The flexible sections may be made of a natural or synthetic rubber material, for example, or other suitably flexible but also suitably stiff and/or suitably resilient material, and may be disposed in a peaked manner such that the flexible sections rest one upon the other at their meeting location. The flexible sections may be completely separate from each other or they may be connected to each other at locations toward at least one end of the lower conveyor section. In some embodiments, flexible hinges such as spring hinges may be provided for coupling the flexible sections 375, 380 to the conveyor sidewalls. In this case, the flexible sections themselves need not necessarily be made of flexible material; rather the flexibility is provided through the hinges and the flexible sections may optionally be formed of rigid material. In this case the flexible sections may be formed of a number of separate panels, so that forcing apart one pair of opposed panels due to interposing of the chute does not result in forcing apart of adjacent opposed panels. In some embodiments, the flexible sections may be formed of a plurality of portions of material which interlock in a hinged manner to provide the required flexibility. Various resilient or non-resilient hinged connections may be used as would be readily understood by a worker skilled in the art, for example rigid sections may be rotatably interlocked with pins to provide flexibility at desired locations. The rigid sections may include overlapping bottom portions configured to inhibit downward flexibility past a certain angle while allowing upward flexibility when encountering the wedge of the material transfer chute.

The dust control apparatus further comprises a material transfer chute 320 which is mounted at the transfer end of the upper conveyor section, substantially in line with an end of the belt conveyor of the upper conveyor section. The chute defines an internal aperture 325 through which the material flows from the upper conveyor section to the lower conveyor section. The outer surface of the chute comprises a pair of tapered, wedge-shaped or plough-shaped features 330, 335 fore and aft, suitably in line with the meeting location 385 of the flexible cover sections. As the chute travels through the gap between to the cover sections, the gap is widened by one of the wedge-shaped features to accommodate the chute. In some embodiments, due to narrowing of the wedge-shaped features and bias of the cover sections toward each other, the gap narrows with distance away from the chute. Such bias may be due for example to one or both of gravitational force and resilience of the flexible material. Due to features 330, 335 fore and aft of the chute, a two-way or double-acting ploughing action through the cover sections is provided. This facilitates motion of the chute between the cover sections in both directions, that is during both extension and retraction of the telescoping conveyor. Further, while extending or retracting the telescoping conveyor, one plough feature functions to separate the cover sections while the other plough feature forms a graduated surface onto which the cover sections can be gradually returned toward each other after being separated.

The dust control apparatus allows for a substantial portion of the lower conveyor section to be covered by the flexible cover sections in cooperation with each other, while also allowing for an opening to be formed at one of a continuum of locations along the lower conveyor's length for material transfer to the lower conveyor. This allows for telescoping of the conveyor while also maintaining an enclosure around the conveyor for example for facilitating dust control by mitigating egress of material from the conveyor.

In some embodiments, the dust control apparatus comprises one or more pressing mechanisms such as rollers 340a and 340b, which are configured to press the flexible cover sections together at a location away from, but typically adjacent to, the material transfer chute. Such pressing mechanisms may be located fore and/or aft of the material transfer chute and function to reduce the size of the opening formed between the cover sections by the chute's outer surface. The rollers may be mounted on pivotable arms which are biased, for example by a spring or hydraulic means, to press the cover sections 375, 380 toward the meeting location 385.

Figure 4A:
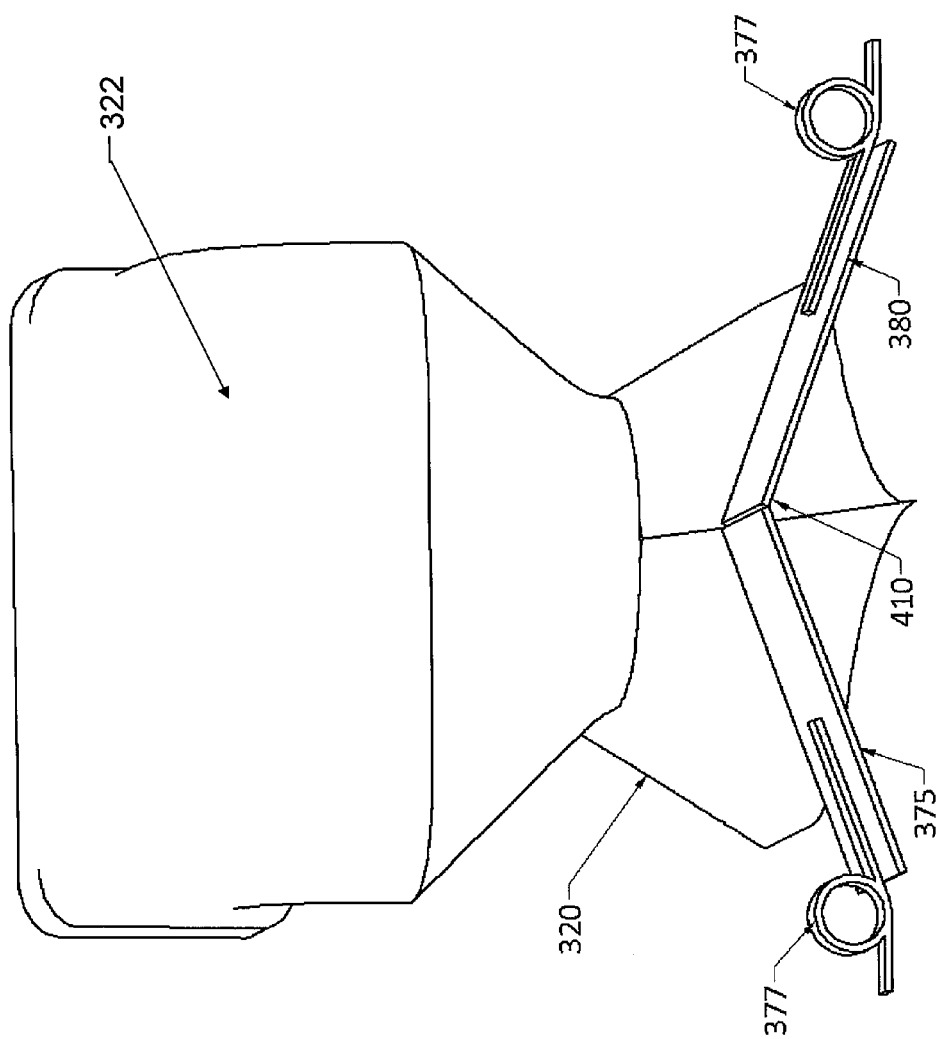
FIGS. 4aa, 4ab and 4b to 4d illustrate a cross sectional views of the flexible sections of the dust control apparatus of FIGS. 3aa, 3ab, 3b and 3c, in accordance with various embodiments of the invention.
Figure 4A:
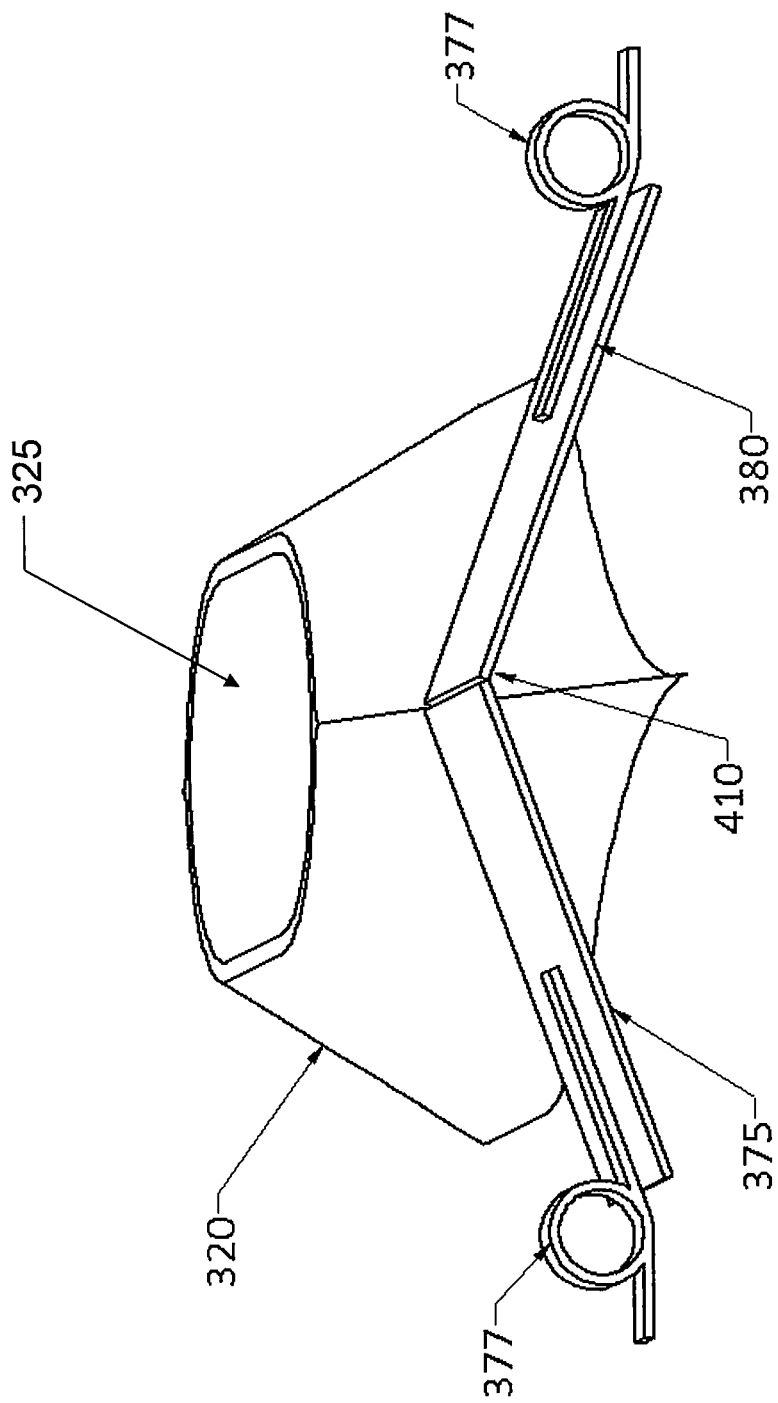

FIGS. 4aa and 4ab illustrate the peaked manner in which the flexible sections 375, 380 may meet, in accordance with some embodiments of the present invention. Optional spring hinges 377 are also shown for connecting the flexible sections to anchoring protrusion on the sidewall. The angle 410 between the flexible sections may be adjusted based on various factors, such as shape of the chute, resilience of the flexible section material, and the like. The flexible sections 375, 380 may rest against each other. The material transfer chute 320 includes a wedge having a leading edge which engages and parts the flexible sections at their meeting point. FIG. 4aa illustrates the chute 320 including a tunnel component 322 as previously described. FIG. 4ab illustrates the chute 320 with the tunnel component removed, to better show the aperture 325.

In some embodiments, the flexible sections may be angled downward, rather than upward. In other embodiments, the flexible sections may be substantially horizontal and/or parallel to each other. However, upwardly angled flexible sections may be preferable in various embodiments since they will tend to fall toward each other under the influence of gravity, thereby forming an enclosure over the conveyor.

In some embodiments, the flexible material may have a relatively low resilience, for example they may be more plastically deformable than elastically deformable. This may require gravity or the use of pressing mechanisms as mentioned above to close the gap between flexible sections following intrusion of the chute therebetween. In some embodiments, the flexible material may have relatively high resilience, in that the material is biased to return to a neutral position following deformation. The neutral position generally may correspond to the flexible sections contacting or substantially proximate each other to close the gap therebetween.

In some embodiments, the flexible sections may comprise substantially straight edges which meet each other. In other embodiments, the edges may be jagged or curved. In some embodiments, brush material, such as nylon material, may protrude outwardly from each edge, the opposing brush portions overlapping with each other to form the enclosure. A nominal gap may exist between the flexible sections even when they are proximate each other to form the enclosure, the gap optionally being bridged by the brush portions.

Figure 4B:
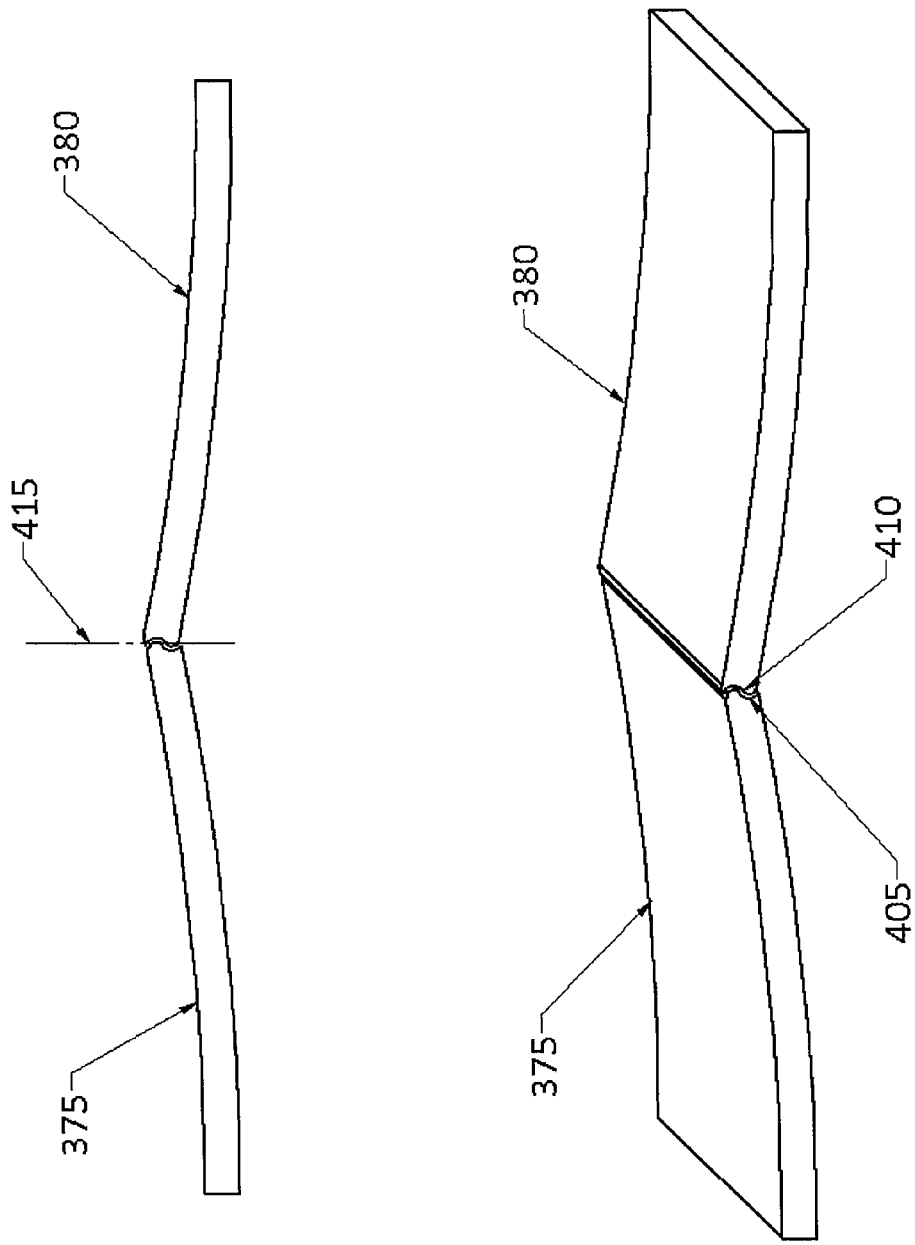

In some embodiments, the edges of the flexible sections 375, 380 may comprise features such as ledges or lips 405, 410 as illustrated in FIG. 4b, which facilitate the resting of the flexible sections each upon the other. In some embodiments, the amount of deviation of such features from a center meeting line 415 is limited, the features are substantially free of sharp corners, or both. This facilitates smooth movement of the wedged material transfer chute between the flexible sections for parting same.

Figure 4C:
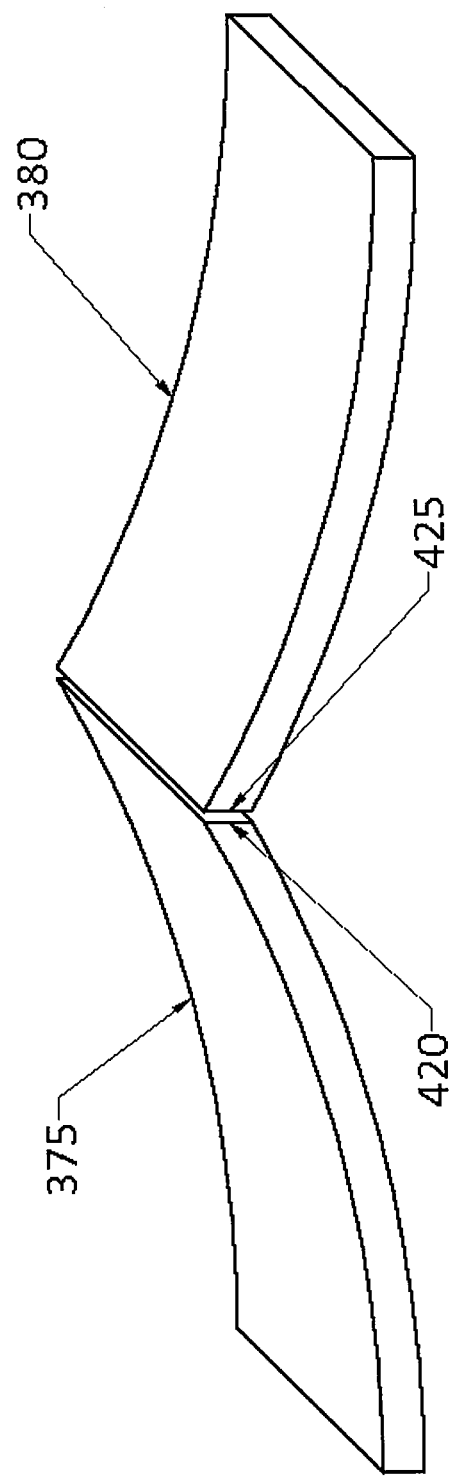
Figure 4D:
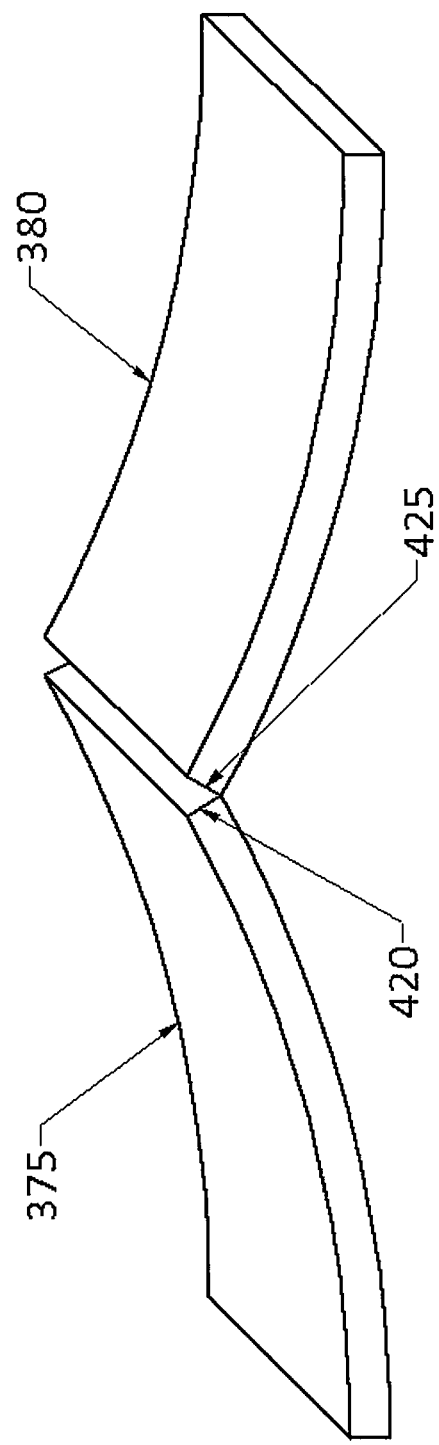

In some embodiments, the edges 420, 425 of the flexible sections 375, 380 are substantially straight and parallel, as illustrated in FIG. 4c, or non-parallel, as illustrated in FIG. 4d. Other configurations and shapes of the edges of the flexible sections may also be used.

The dust control apparatus as described above may be applied in particular for use on a telescoping conveyor, which allows for dust control to be applied at varying conveyor lengths, and mitigates dust and/or material loss due to movement of bulk material along the conveyor as well as between conveyor sections. It is, however, noted that the dust control apparatus may be incorporated into other applications. For example the cover sections may be provided to enclose a container which does not include a conveyor, and the material transfer chute may be movably interposed between the cover sections so as to deposit material in various locations within the enclosed container. As another example, the cover sections may be provided on a material receiving portion of a conveyor and the material transfer chute may be configured as a movable hopper which allows material to be inserted onto the conveyor at a variable location.

Another aspect of the present invention provides for a hydraulic fluid transmission system which includes at least one hollow structural element which also operates as a conduit for the hydraulic fluid. The structural element is formed of a material, such as metal, which is of sufficient strength to provide structural support to an associated apparatus, while also adequately containing the hydraulic fluid under pressure. The material is further conductive of heat, so that excess heat from the hydraulic fluid is radiated to the exterior of the structural element. The radiated heat may be used for a further purpose, for example to melt snow or ice off of the exterior of the structure. The structural element may be formed of metal, for example, with an interior channel having a substantially circular cross section. The hollow structural element generally forms a portion of the hydraulic fluid transmission system between the hydraulic power source and one or more hydraulically driven mechanical elements, such as pistons. In various embodiments the transmission line may convey fluid in either direction under pressure. The hollow structural element may be connected to other hoses or conduits of the transmission system via flexible couplings such as hoses, as would be readily understood by a worker skilled in the art. In one embodiment the hollow member may be made by an extrusion process.

Figure 5A:
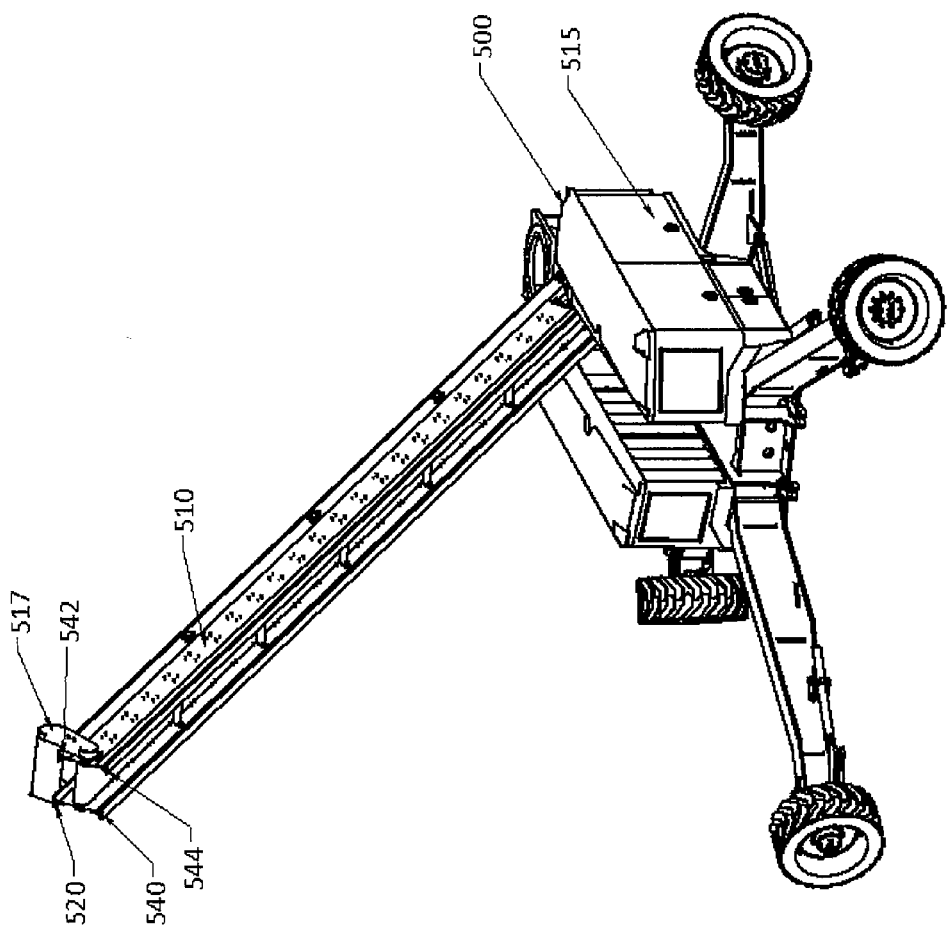
FIGS. 5a and 5b illustrate a hydraulic fluid transmission system provided in accordance with one embodiment of the invention.
Figure 5B:
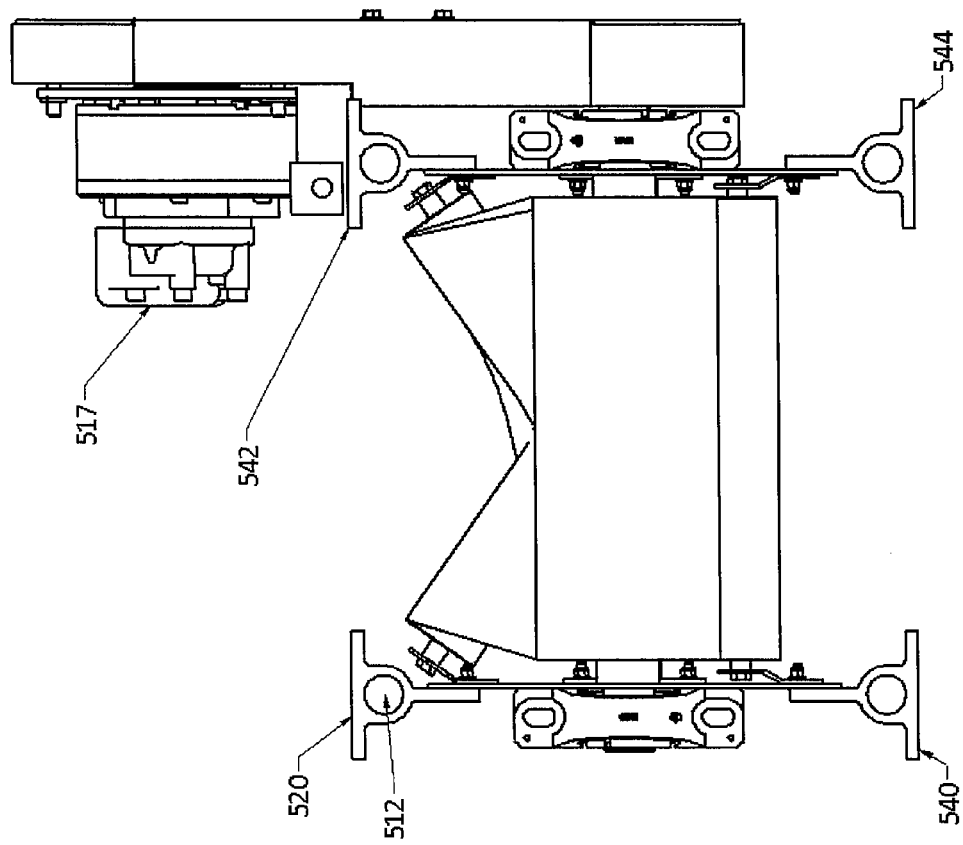

In various embodiments the structural element forms part of a mobile conveyor vehicle, such as an element of or supporting a telescoping conveyor section mounted on the vehicle. The hydraulic drive system may be used for telescoping, orienting and/or driving the conveyor, for example. By way of example, FIGS. 5a and 5b illustrate a hydraulic fluid transmission system, in perspective and cross section, respectively, for a mobile conveyor vehicle 500 comprising a structural frame 510 and a source of hydraulic fluid 515. The hydraulic fluid transmission system comprises at least one hollow metallic member 520 forming a structural element of a structural frame. In the illustrated case, the member 520 extends along a length of the conveyor section and includes an interior aperture 512 for conveying fluid along its length. The hollow metallic member 520 is operatively coupled to the source of hydraulic fluid 515 and operates as a transmission line. The hollow metallic member 520 is further configured to radiate excess heat from the hydraulic fluid outward for heating the vehicle structure and potentially facilitating melting of snow or ice on the structure. A plurality of such hollow metallic members, including 520 as well as 540, 542, 544, may be provided, for example one at each corner of the conveyor section. Hot oil from a hydraulic motor 517 may be returned through the upper members 520, 542 and pressurized oil to the hydraulic motor may be routed through the lower members 540, 544.

It is noted that the particular mobile conveyor vehicle, dust control apparatus and hydraulic fluid transmission system as described herein may be provided together or separately in accordance with different embodiments of the invention. In some embodiments, one or both of the dust control apparatus and the hydraulic fluid transmission system may be incorporated into other systems, such as other types of mobile conveyor vehicles or other work vehicles.

Figure 6:
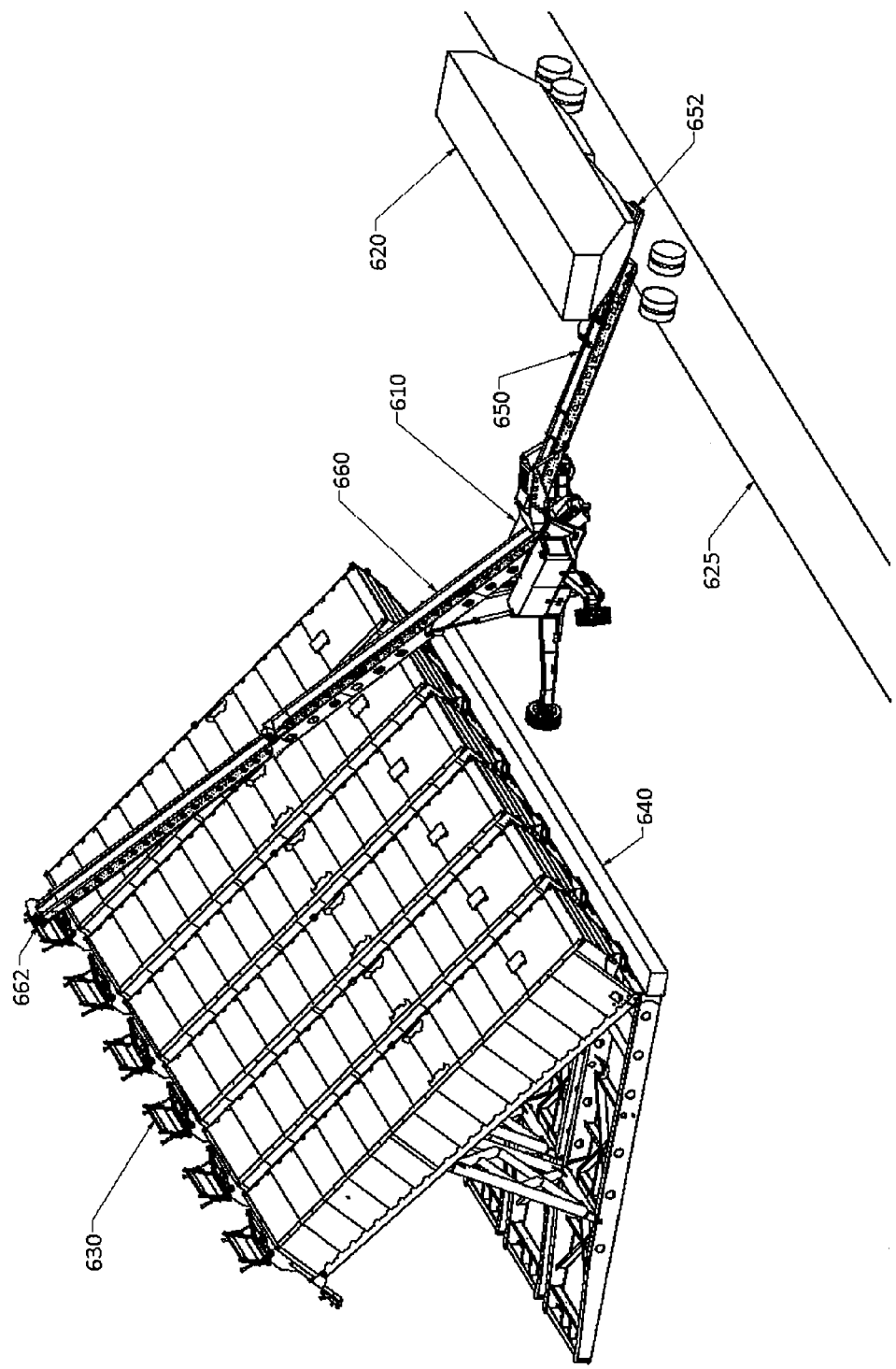
FIG. 6 illustrates a bulk material delivery, handling and storage system comprising a mobile conveyor vehicle provided in accordance with one embodiment of the invention.

FIG. 6 illustrates a system comprising a mobile conveyor vehicle 610 as described herein, receiving bulk material from a delivery truck 620 and conveying the material to one of a plurality of elevated storage containers 630. The system may be mobile and set up for substantially temporary use in a remote location, such as a hydraulic fracturing site. The delivery truck 620 may be located at a delivery point located along a suitably placed vehicle-accessible road or path 625. The storage containers 630 may be arranged for example along a line adjacent to a conveyor 640 which receives material from the storage containers as needed for example to facilitate hydraulic fracturing operations. The system may integrate various components of a SandStorm™ material handling system provided by TyCrop™, for example with the storage containers 630 corresponding to GravityBox™ containers as also provided by TyCrop™. In some embodiments, the storage containers may include multiple hatches for receiving material at different locations. The conveyor vehicle may be configured to position the endpoints 652, 662 of its infeed conveyor 650 and output conveyor 660, respectively, so as to receive material from an output hatch of the delivery truck 620 and deliver it to a selected one of the storage containers 630. Positioning the conveyor endpoints 652, 662 may comprise rotating the conveyors, telescoping the conveyors, elevating or lowering the conveyors, and optionally moving the vehicle itself from one location to another. In some embodiments, the vehicle 610 may be placed at an alternate location on the opposite side of the line of storage containers. The output conveyor endpoint 662 may be capable of traversing roughly in an arc and of extending such that it can discharge into a selected one of the storage containers 630, preferably without relocation of the vehicle or containers. In one embodiment, the output conveyor is extendable by about 46 feet and capable of elevation of up to about 56 feet.

In some embodiments, the output conveyor endpoint 662 may also be capable of discharging at extended minimum and maximum reach into low elevation devices such as industrial sand conveyors, blenders, bulk tankers, and ground-level stockpiles, and the like. Discharging into bulk tankers may be desirable for material removal on job completion.

In various embodiments, the mobile conveyor vehicle is controlled by a remote control system, comprising radio communication components, sensor and actuator components, transducers, and the like.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A dust control apparatus for a telescopic conveyor system, the conveyor system including an upper conveyor section for delivering material from an input end to a transfer end, and a lower conveyor section in telescoping relation with the upper conveyor section; the apparatus comprising:

a. a cover mounted overtop of the lower conveyor section, the cover comprising a pair of separate, flexible sections mounted on opposite sides of the lower conveyor section and biased to extend toward one another; and
 b. a material transfer chute mounted at the transfer end of the upper conveyor section, the chute having an outer surface shaped to interpose between and force apart the flexible sections of the cover as the chute travels between the cover flexible sections due to telescoping motion of the conveyor system, the chute defining an internal aperture for flow of the material from the transfer end of the upper conveyor section onto the lower conveyor section.

2. The apparatus according to claim 1, wherein the flexible sections extend toward one another such that they substantially contact each other or overlap.

3. The apparatus according to claim 1, wherein the flexible sections are resiliently biased to extend toward each other.

4. The apparatus according to claim 1, wherein the outer surface comprises at least one wedge for forcing apart the flexible sections.

5. The apparatus according to claim 1, further comprising at least one pressing mechanism configured to press the flexible sections toward each other at a location adjacent to the chute.

\* \* \* \* \*